United States Patent
Kishiyama et al.

(10) Patent No.: US 8,265,043 B2
(45) Date of Patent: Sep. 11, 2012

(54) TRANSMITTING DEVICE, RECEIVING DEVICE, AND METHOD USED IN MOBILE COMMUNICATION SYSTEM EMPLOYING OFDM

(75) Inventors: Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 519 days.

(21) Appl. No.: 12/521,208

(22) PCT Filed: Dec. 27, 2007

(86) PCT No.: PCT/JP2007/075169
§ 371 (c)(1),
(2), (4) Date: Aug. 19, 2009

(87) PCT Pub. No.: WO2008/084719
PCT Pub. Date: Jul. 17, 2008

(65) Prior Publication Data
US 2010/0027512 A1 Feb. 4, 2010

(30) Foreign Application Priority Data
Jan. 9, 2007 (JP) .................................. 2007-001858

(51) Int. Cl.
*H04J 3/00* (2006.01)
(52) U.S. Cl. ....................................................... 370/336
(58) Field of Classification Search .......... 370/203–211; 375/259–260
See application file for complete search history.

(56) References Cited

U.S. PATENT DOCUMENTS

| | | | |
|---|---|---|---|
| 2001/0004389 A1 | 6/2001 | Kimura et al. | |
| 2006/0120270 A1* | 6/2006 | Han et al. ....................... | 370/208 |
| 2008/0273517 A1* | 11/2008 | Nishio et al. ................... | 370/345 |
| 2008/0304583 A1 | 12/2008 | Miyoshi et al. | |
| 2009/0104908 A1 | 4/2009 | Matsumoto et al. | |

FOREIGN PATENT DOCUMENTS

| | | |
|---|---|---|
| EP | 0930752 A2 | 7/1999 |
| EP | 1411664 A1 | 4/2004 |

(Continued)

OTHER PUBLICATIONS

Japanese Office Action for Application No. 2007-001858, mailed on Sep. 14, 2010 (6 pages).

(Continued)

*Primary Examiner* — Hassan Kizou
*Assistant Examiner* — Charles C Jiang
(74) *Attorney, Agent, or Firm* — Osha Liang LLP

(57) ABSTRACT

A transmitting device includes a transmission signal generating unit configured to generate a transmission signal by inverse-Fourier-transforming reference signals and data signals mapped to subcarriers and a transmitting unit configured to wirelessly transmit the transmission signal. In the transmitting device, a total power level allocated to signals to be transmitted in a time slot is equal to a total power level allocated to signals to be transmitted in any other time slot, and a power density per unit bandwidth of the reference signals is greater than a power density per unit bandwidth of the data signals. This configuration makes it possible to equalize the total transmission power level of all time slots and thereby to improve the power amplification efficiency. Also, with this configuration, since the reference signals are transmitted with a higher power than that for other signals, it is possible to improve the accuracy of channel estimation.

11 Claims, 5 Drawing Sheets

FOREIGN PATENT DOCUMENTS

| | | | |
|---|---|---|---|
| JP | 05-075568 | A | 3/1993 |
| JP | 11-317723 | A | 11/1999 |
| JP | 2000-358008 | A | 12/2000 |
| JP | 2003-32218 | A | 1/2003 |
| JP | 2003-032218 | A | 1/2003 |
| JP | 2006-287895 | A | 10/2006 |
| JP | 2008-160822 | A | 7/2008 |
| WO | 2004/077685 | A2 | 9/2004 |
| WO | 2004/077728 | A2 | 9/2004 |
| WO | 2006011376 | A1 | 2/2006 |
| WO | 2006-126616 | A1 | 11/2006 |
| WO | 2006118124 | A1 | 11/2006 |
| WO | WO 2006118124 | A1 * | 11/2006 |

OTHER PUBLICATIONS

Patent Abstracts of Japan for Japanese Publication No. 2006-287895, publication date Oct. 19, 2006 (1 page).

Patent Abstracts of Japan for Japanese Publication No. 2003-032218, publication date Jan. 31, 2003 (1 page).

Patent Abstracts of Japan for Japanese Publication No. 2008-160822, publication date Jul. 10, 2008 (1 page).

Mexican Office Action for Application No. MX/a/2009/007186, mailed on Nov. 17, 2010 (6 pages).

International Search Report w/translation from PCT/JP2007/075169 dated Apr. 8, 2008 (4 pages).

Written Opinion from PCT/JP2007/075169 dated Apr. 8, 2008 (4 pages).

Patent Abstracts of Japan; Publication No. 05-075568 dated Mar. 26, 1993; France Telecom (1 page).

Patent Abstracts of Japan; Publication No. 2000-358008 dated Dec. 26, 2000; Mitsubishi Electric Corp. (1 page).

Patent Abstracts of Japan; Publication No. 11-317723 dated Nov. 16, 1999; Motorola Incorporated (1 page).

Patent Abstracts of Japan; Publication No. 2003-032218 dated Jan. 31, 2003; Matsushita Electric Industrial Co., Ltd. (1 page).

3GPP TR 25.814 V1.2.0, pp. 18-20, Feb. 2006.

European Search Report received in corresponding application No. EP 07 85 9796, dated Mar. 13, 2012, 12 pages.

"3rd Generation Partnership Project; Technical specification Group Radio Access Network; Evolved Universal Terrestrial Radio Access (E-UTRA) and Evolved Universal Terrestrial Radio Access Network (E-UTRAN); Radio interface protocol aspects (Release 7)," 3GPP Standard; 3GPP TR 25.813, Sep. 1, 2006; pp. 1-41.

"3rd Generation Partnership Project; Technical Specification Group Radio Access Network; LTE Physical Layer—General Description (Release 8)," 3GPP Standard; 3GPP TS 36.201, Nov. 1, 2006, pp. 1-12.

"Universal Mobile Telecommunications System (UMTS); Physical later procedures (TDD) (3GPP TS 25.224 version 7.1.0 Rekease 7); ETSI TS 125 224," Sep. 1, 2006, pp. 1-62.

* cited by examiner

TRANSMITTING DEVICE, RECEIVING DEVICE, AND METHOD USED IN MOBILE COMMUNICATION SYSTEM EMPLOYING OFDM

TECHNICAL FIELD

The present invention generally relates to mobile communication technologies. More particularly, the present invention relates to a transmitting device, a receiving device, and a method used in a mobile communication system employing orthogonal frequency division multiplexing (OFDM).

BACKGROUND ART

In a third generation mobile communication system such as IMT-2000, signals such as pilot signals and data signals are transmitted according to code division multiple access (CDMA). In such a communication system, pilot signals are used for channel estimation and play a central role in reception quality assurance. Therefore, pilot signals are often transmitted with a power level higher than that of other signals (power boost).

Meanwhile, in a future mobile communication system succeeding the third generation system, it is planned to use a wider frequency band and to use OFDM for downlink to improve the quality, speed, and capacity of the system (see, for example, 3GPP, TR25.814). Also in such a future mobile communication system (for example, Long Term Evolution (LTE)), it is preferable to improve the accuracy of channel estimation based on pilot signals and therefore it is preferable to transmit pilot signals with a higher power level than that of other signals (such as data signals). Pilot signals may also be called, for example, reference signals, training signals, and known signals.

In OFDM, the total power level necessary to transmit signals in a time slot is obtained by adding up power densities of data mapped to all subcarriers. If a total power level Pall exceeds a maximum allowable transmission power level $P_{MAX}$ of a transmitter, undesired distortion is caused in the transmission signal. Therefore, the total power level Pall is preferably limited to or below the maximum allowable transmission power level $P_{MAX}$. However, while it is unknown what types of data signals are to be mapped to which subcarriers before the data signals are finally determined, it is difficult to limit the total power level Pall to or below the maximum allowable transmission power level $P_{MAX}$ after the data signals are mapped to the subcarriers.

Also, since it is not necessary to always send reference signals, each time slot may or may not include reference signals. Therefore, when the reference signals are to be sent with a high power level, the total power levels Pall necessary for respective time slots differ greatly. Here, it may be possible to reserve a fairly large margin for the power density of data to be mapped to each subcarrier such that the total power level Pall of each time slot does not exceed the maximum allowable transmission power level $P_{MAX}$. However, this approach may reduce the amplification efficiency of a transmission power amplifier.

DISCLOSURE OF INVENTION

Problems to be Solved by the Invention

One object of the present invention is to improve the accuracy of channel estimation as well as the transmission power amplification efficiency in a mobile communication system employing OFDM.

Means for Solving the Problems

An aspect of the present invention provides a transmitting device for sending a transmission signal modulated according to OFDM. The transmitting device includes a transmission signal generating unit configured to generate a transmission signal by inverse-Fourier-transforming reference signals and data signals mapped to subcarriers and a transmitting unit configured to wirelessly transmit the transmission signal. In the transmitting device, a total power level allocated to signals to be transmitted in a time slot is equal to a total power level allocated to signals to be transmitted in any other time slot, and a power density per unit bandwidth of the reference signals is greater than a power density per unit bandwidth of the data signals.

Advantageous Effect of the Invention

An aspect of the present invention makes it possible to improve the accuracy of channel estimation as well as the transmission power amplification efficiency in a mobile communication system employing OFDM.

EXPLANATION OF REFERENCES

Figure 1:
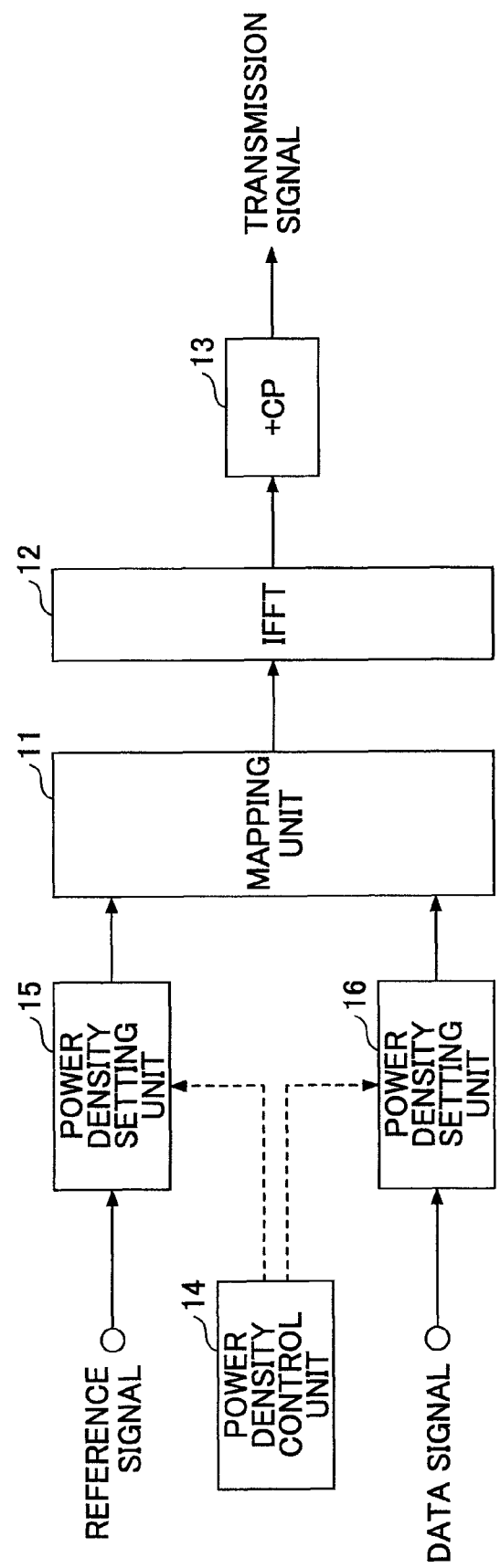
FIG. 1 is a partial block diagram illustrating a transmitting device according to an embodiment of the present invention.

11 Mapping unit
12 Inverse fast Fourier transform (IFFT) unit
13 Guard interval adding unit (+CP)
14 Power density control unit
15, 16 Power density setting unit
21 Cyclic prefix removing unit (−CP)
22 Fast Fourier transform (FFT) unit
23 Demapping unit
24 Channel estimation unit
25 Channel decoding unit

BEST MODE FOR CARRYING OUT THE INVENTION

In an OFDM transmitting device according to an embodiment of the present invention, transmission power is controlled such that a total power level allocated to signals to be transmitted in a time slot equals a total power level allocated to signals to be transmitted in any other time slot, and the power density per unit bandwidth of a reference signal is set greater than that of a data signal. This configuration makes it possible to equalize the total transmission power level of all time slots and thereby to improve the power amplification efficiency. Also, with this configuration, since a reference signal is transmitted with a higher power level than that of other signals, it is possible to improve the accuracy of channel estimation. Power information indicating the transmission power level of reference signals may be sent to a receiving device as L1/L2 control information (lower layer control information), broadcast information (BCH), or L3 control information (higher layer control information). Alternatively, the transmission power level of reference signals may be set at a fixed value for a system so that it is not necessary to send the power information each time.

According to another embodiment of the present invention, mapping of a data signal to a predetermined subcarrier is prevented in a time slot where a reference signal is to be transmitted. This configuration makes it possible to equalize the power density per unit bandwidth of data signals to be transmitted in different time slots regardless of whether a reference signal is to be transmitted in the respective time slots. In other words, this configuration makes it possible to equalize the transmission power density of data signals in all time slots. This in turn eliminates the need for the receiving end to have multiple sets of likelihood information for data signals for respective transmission power levels. Power information indicating the subcarriers to which mapping of data signals is prevented may be sent to a receiving device as L1/L2 control information (lower layer control information), broadcast information (BCH), or L3 control information (higher layer control information). Alternatively, the subcarriers may be fixed for a system so that it is not necessary to send the power information each time.

Although the present invention is described below in different embodiments, the distinctions between the embodiments are not essential for the present invention, and the embodiments may be implemented individually or in combination.

First Embodiment

FIG. 1 is a partial block diagram of an OFDM transmitting device according to an embodiment of the present invention. Typically, the transmitting device is provided in a base station in a mobile communication system employing OFDM for downlink. Alternatively, the transmitting device may be provided in any other apparatus employing OFDM for transmission. As shown in FIG. 1, the transmitting device includes a mapping unit 11, an inverse fast Fourier transform (IFFT) unit 12, a guard interval adding unit (+CP) 13, a power density control unit 14, and power density setting units 15 and 16.

The mapping unit 11 maps power-density-adjusted reference signals and power-density-adjusted data signals to multiple subcarriers arranged along the frequency axis. Typically, signals such as reference signals and data signals are mapped to subcarriers as in FIG. 1. However, other signals such as control signals may also be mapped to subcarriers.

The inverse fast Fourier transform (IFFT) unit 12 inverse-fast-Fourier-transforms the mapped signals and modulates the transformed signals according to OFDM to generate effective symbols in transmission symbols.

The guard interval adding unit (+CP) 13 attaches guard intervals to the OFDM-modulated signals (at this stage, to the effective symbols) and thereby generates OFDM symbols constituting a transmission signal. The transmission signal is transmitted wirelessly by a component not shown. The guard interval is also called a cyclic prefix and is generated by duplicating a part of an effective symbol in a transmission symbol.

For brevity, components such as a serial-parallel converter (S/P) and a parallel-serial converter (P/S) are omitted in FIG. 1. However, a person skilled in the art may understand that such components are provided together with the mapping unit 11 and the IFFT unit 12 as necessary.

The power density control unit 14 determines the power density (power density per unit bandwidth) of data to be mapped to respective subcarriers. "Data" in this case refer to reference signals and data signals. In this embodiment, as described later, the power density is adjusted such that the total power levels Pall necessary to transmit signals become substantially the same in all time slots.

The power density setting unit 15 adjusts the power density of reference signals according to a request from the power density control unit 14.

The power density setting unit 16 adjusts the power density of data signals according to a request from the power density control unit 14.

Figure 2:
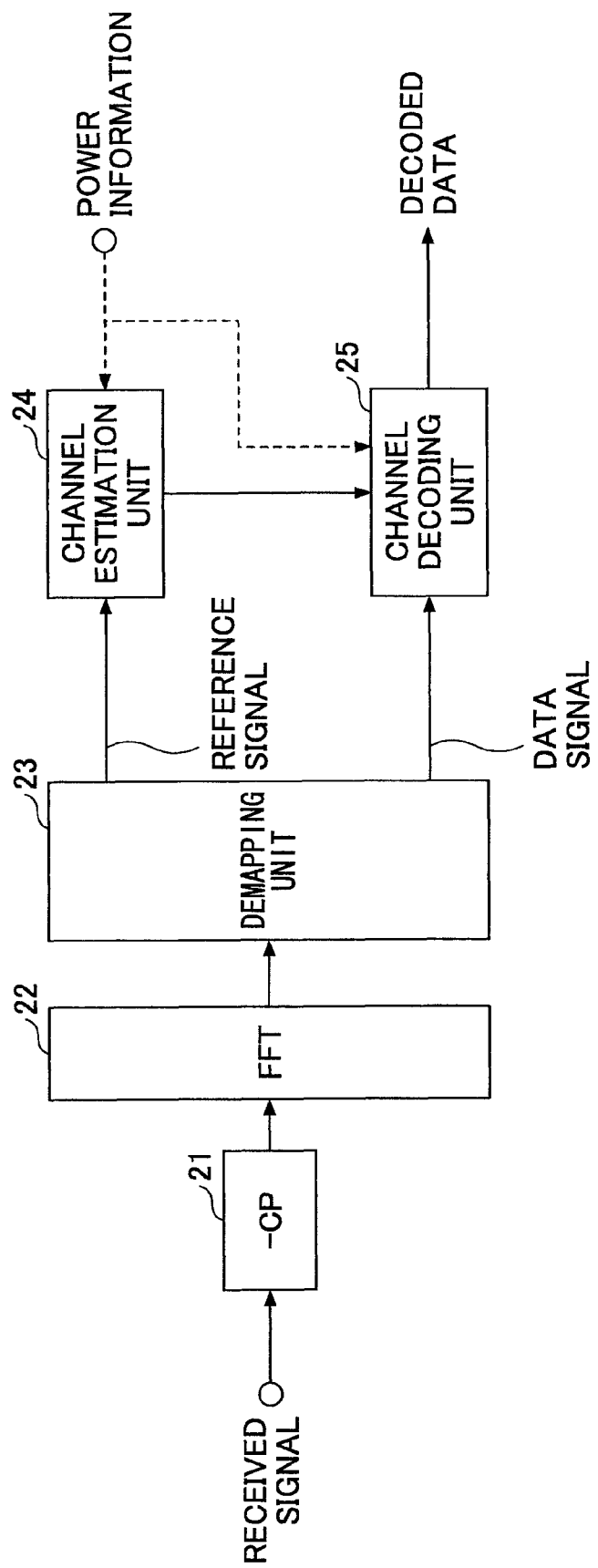
FIG. 2 is a partial block diagram illustrating a receiving device according to an embodiment of the present invention.

FIG. 2 is a partial block diagram illustrating an OFDM receiving device. Typically, the receiving device is provided in a user device in a mobile communication system employing OFDM for downlink. Alternatively, the receiving device may be provided in any other apparatus employing OFDM for transmission. As shown in FIG. 2, the receiving device includes a cyclic prefix removing unit (−CP) 21, a fast Fourier transform (FFT) unit 22, a demapping unit 23, a channel estimation unit 24, and a channel decoding unit 25.

The cyclic prefix removing unit (−CP) 21 removes guard intervals from OFDM symbols in a received signal and thereby extracts effective symbols from the received signal.

The fast Fourier transform (FFT) unit 22 fast-Fourier-transforms the effective symbols in the received signal and thereby demodulates the effective symbols according to OFDM.

The demapping unit 23 separates reference signals and data signals from the demodulated signal.

The channel estimation unit 24 performs channel estimation based on the separated reference signals and thereby determines channel compensation parameters for the data signals. In this embodiment, the channel estimation unit 24 performs channel estimation based on power information indicating the power density of the reference signals sent from the transmitting end. The power information may be sent from the transmitting device of FIG. 1 to the receiving device of FIG. 2 via a control signal, or sent as broadcast information (BCH) or layer 3 information.

The channel decoding unit 25 decodes the data signals while performing channel compensation based on the channel estimation results and outputs the decoded data signals to a subsequent processing unit (not shown) As in FIG. 1, components such as a serial-parallel converter (S/P) and a parallel-serial converter (P/S) are omitted in FIG. 2 for brevity. However, a person skilled in the art may understand that such components are provided together with the FFT unit 22 and the demapping unit 23 as necessary.

An exemplary process is described below. The transmitting device of FIG. 1 transmits transmission signals each including a predetermined number of OFDM symbols sequentially at a predetermined interval. The predetermined interval may be called a time slot or a transmission time interval (TTI). In this embodiment, the power density control unit 14 controls the power density such that substantially the same total power level is allocated to signals transmitted in any time slot.

Figure 3:
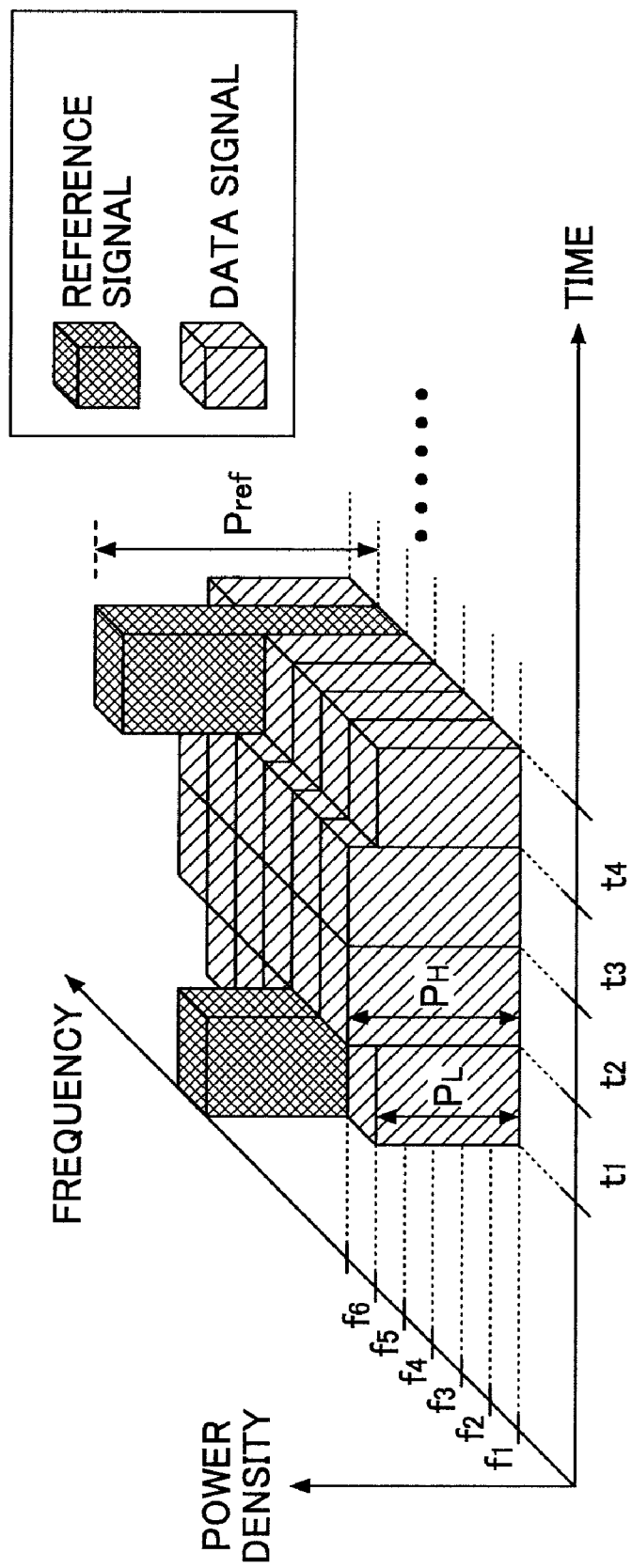
FIG. 3 is a drawing illustrating adjusted power densities according to a first embodiment of the present invention.

FIG. 3 is a schematic diagram showing power-density-controlled reference signals and power-density-controlled data signals mapped to subcarriers on the frequency axis. FIG. 3 corresponds to an output from the mapping unit 11 of FIG. 1. Labels t1, t2, t3, and t4 on the time axis indicate four time slots. Labels f1, f2, f3, f4, f5, and f6 on the frequency axis indicate six subcarriers. In each of the time slots t1 and t4, a reference signal and data signals are frequency-multiplexed. In the time slots t1 and t4, the power density of the data signals is set at $P_L$ and the power density of the reference signals is set at Pref. In the time slots t2 and t3, no reference signal is multiplexed. The power density of data signals in the time slots t2 and t3 is set at $P_H$. In this embodiment, power densities are adjusted such that total power level Pall(t1)=5×$P_L$+Pref necessary to transmit signals in the time slot t1 equals total power level Pall(t2)=6×$P_H$ necessary to transmit signals in the time slot t2. In other words, power densities are adjusted such that the total power levels of all time slots are equalized:

Pall(t1)=Pall(t2)=Pall(t3)=Pall(t4)= . . . .

After the power densities and the total power levels are adjusted, the transmission signals are sent from the transmitting device of FIG. 1 and received by the receiving device as shown in FIG. 2. Here, first power information indicating the difference between the transmission power density Pref of the reference signals and the transmission density of other signals is sent to the receiving device. If the first power information is frequently changed, the information may be sent via a lower-layer control signal such as an L1/L2 control signal. If the first power information is changed at comparatively long intervals, the information may be sent as L3 signaling information or broadcast information (BCH). Also, if the first power information is fixed in the system, there is no need to send the first power information each time. In any case, it is possible to accurately perform channel estimation by comparing the power density Pref with the reception power of the reference signal.

Thus, the first embodiment makes it possible to adjust power densities such that the total power levels Pall of all time slots are equalized. This in turn makes it possible to send reference signals with a higher power level than that of other signals and thereby to accurately perform channel estimation.

The numbers of subcarriers and time slots in the above descriptions are just examples used for descriptive purposes. In practice, signals are transmitted using large numbers of subcarriers and time slots. In FIG. 3, for brevity, only one reference signal is mapped to one time slot. However, any number of reference signals may be mapped to one time slot. Also, the present invention may be applied to a case where signals, such as control signals, are mapped in addition to reference and data signals.

Second Embodiment

In the first embodiment, signals are mapped to all subcarriers and the power densities of the signals are adjusted such that the total power levels Pall of all time slots are equalized. For this reason, the power density $P_L$ of data signals in the time slots t1 and t4 is different from the power density $P_H$ of data signals in the time slots t2 and t3 ($P_L<P_H$). Therefore, in the first embodiment, the likelihood (likelihood information) of data signals transmitted with the power density $P_H$ is different from the likelihood (likelihood information) of data signals transmitted with the power density $P_L$. Strictly speaking, this in turn makes it necessary to provide different sets of likelihood information for the data signals with the power density $P_H$ and the data signals with the power density $P_L$ and therefore complicates the decoding process. A second embodiment of the present invention tries to solve or reduce this problem.

Figure 4:
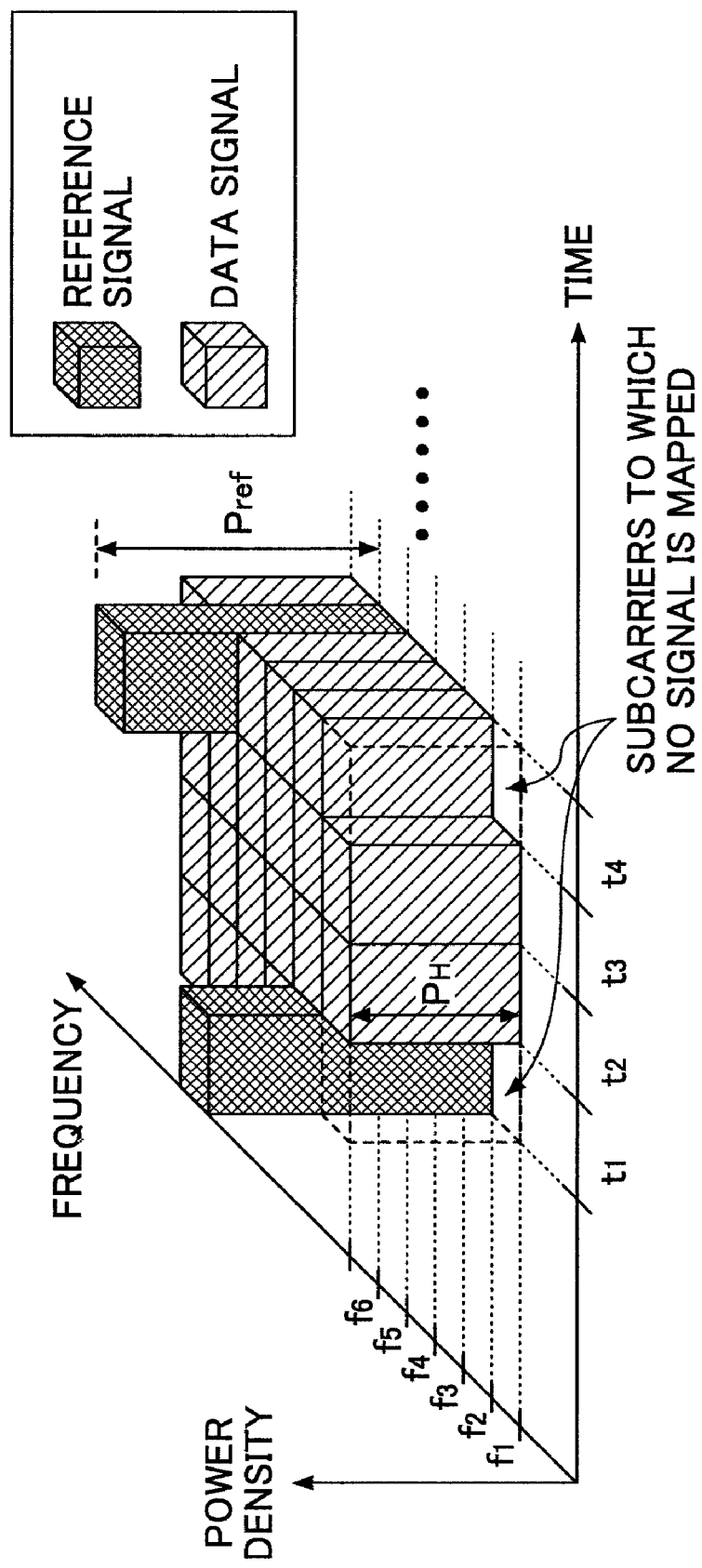
FIG. 4 is a drawing illustrating adjusted power densities according to a second embodiment of the present invention.

FIG. 4 is a drawing illustrating adjusted power densities according to a second embodiment of the present invention. As in the first embodiment, the power densities are adjusted such that the total power levels Pall of all time slots are equalized. The second embodiment is different from the first embodiment in that a subcarrier to which no signal is mapped is present in a time slot including a reference signal. As indicated by dotted lines forming cuboids, the power levels of the subcarrier f1 in the time slot t1 and the subcarrier f1 in the time slot t4 are zero and no signal is mapped to those subcarriers. Meanwhile, the power densities of all data signals mapped to subcarriers are the same ($P_H$). In this embodiment, as shown in FIG. 4, the power density Pref of reference signals is represented by Pref=$P_H$+$P_H$=2×$P_H$. The total power level Pall of the time slots t2 and t3 is represented by Pall(t2)=Pall(t3)=6×$P_H$, and the total power level Pall of the time slots t1 and t4 are represented by Pall(t1)=Pall(t4)=4×$P_H$+(2×$P_H$)=6×$P_H$. Thus, in this embodiment, mapping of signals to one or more subcarriers is prevented in a time slot including a reference signal, and the unused power for the subcarriers is allocated to the reference signal. This makes it possible to transmit a reference signal with a higher power level than that of other signals while keeping the total power level Pall constant.

In this case, second power information indicating subcarriers (hereafter called "null subcarriers") to which no signal is mapped is sent to the receiving device. If the second power information is frequently changed, the information may be sent via a lower-layer control signal such as an L1/L2 control signal. If the second power information is changed at comparatively long intervals, the information may be sent as L3 signaling information or broadcast information (BCH). Also, if the second power information is fixed in the system, there is no need to send the second power information each time. The number of null subcarriers may be changed according to the need. The positions of the null subcarriers may be fixed, or may be changed as time passes or according to a hopping pattern designed to change the positions of the null subcarriers in the frequency direction and/or the time direction.

Figure 5:
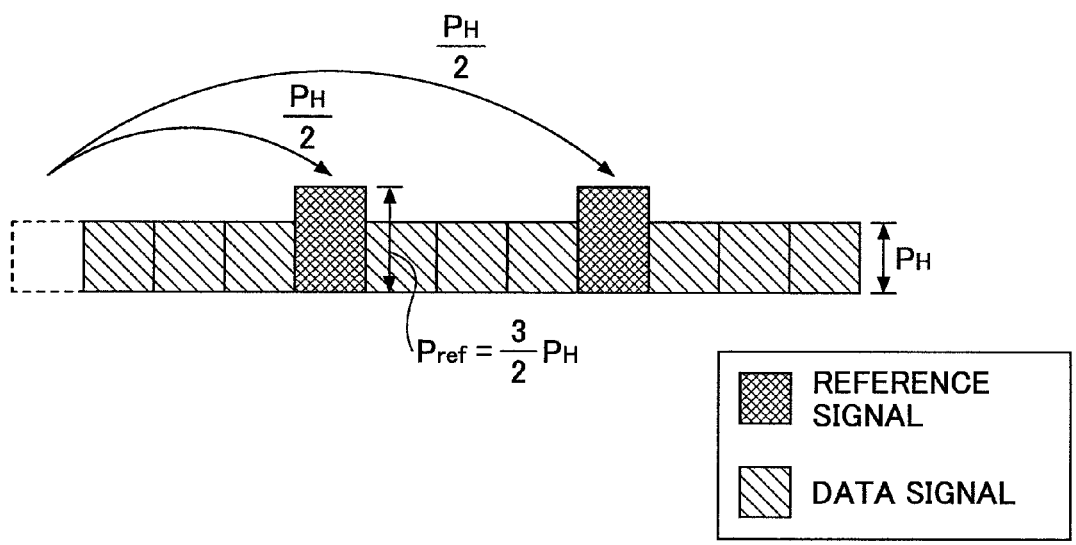
FIG. 5 is a drawing showing a method where unused power for a null subcarrier is allocated to reference signals.

In the example shown in FIG. 4, the power density Pref of a reference signal is represented by Pref=$P_H$+$P_H$. Alternatively, as shown in FIG. 5, the power density Pref may be a sum of $P_H$ and a fraction of $P_H$ (for example, Pref=(3/2)×$P_H$). That is, the number of null subcarriers can be determined according to the transmission power level of reference signals.

As described above, the second embodiment makes it possible to send reference signals with a higher power level than that of other signals and to make the power density of data signals constant while equalizing the total power levels Pall of all time slots. Thus, the second embodiment makes it possible to provide advantageous effects of the first embodiment without increasing the number of sets of likelihood information for data signals.

The present invention is not limited to the specifically disclosed embodiments, and variations and modifications may be made without departing from the scope of the present invention. Although specific values are used in the above descriptions to facilitate the understanding of the present invention, the values are just examples and different values may also be used unless otherwise mentioned. The distinctions between the embodiments are not essential for the present invention, and the embodiments may be used individually or in combination. Although functional block diagrams are used to describe apparatuses in the above embodiments, the apparatuses may be implemented by hardware, software, or a combination of them.

The present international application claims priority from Japanese Patent Application No. 2007-001858 filed on Jan. 9, 2007, the entire contents of which are hereby incorporated herein by reference.

The invention claimed is:

1. A transmitting device for sending a transmission signal modulated according to OFDM, comprising:
   a transmission signal generating unit configured to generate the transmission signal by inverse-Fourier-transforming a reference signal and a data signal mapped to subcarriers; and
   a transmitting unit configured to wirelessly transmit the transmission signal, wherein
   a total power level allocated to a first signal to be transmitted at a timing when the reference signal and the data signal are frequency-multiplexed is equal to a total power level allocated to a second signal to be transmitted at a timing when only the data signal is mapped;
   at the timing of the first signal where the reference signal and the data signal are frequency-multiplexed, mapping of the data signal to a predetermined subcarrier is prevented and a power density per unit bandwidth of the reference signal is greater than a power density per unit bandwidth of the data signal; and
   the power density per unit bandwidth of the data signal in the second signal is the same as the power density per unit bandwidth of the data signal in the first signal.

2. The transmitting device as claimed in claim 1, wherein the transmitting unit is configured to report power information indicating a difference between the power density per unit bandwidth of the reference signal and the power density per unit bandwidth of the data signal.

3. The transmitting device as claimed in claim 2, wherein the data signal includes a user data signal and/or control data signal.

4. The transmitting device as claimed in claim 1, wherein the data signal includes a user data signal and/or control data signal.

5. A method of sending a transmission signal modulated according to OFDM, comprising the steps of:
   generating the transmission signal by inverse-Fourier-transforming reference signal and data signal mapped to subcarriers; and
   wirelessly transmitting the transmission signal, wherein
   a total power level allocated to a first signal to be transmitted at a timing when the reference signal and the data signal are frequency-multiplexed is equal to a total power level allocated to a second signal to be transmitted at a timing when only the data signal is mapped;
   at the timing of the first signal where the reference signal and the data signal are frequency-multiplexed, mapping of the data signal to a predetermined subcarrier is prevented and a power density per unit bandwidth of the reference signal is greater than a power density per unit bandwidth of the data signal; and
   the power density per unit bandwidth of the data signal in the second signal is the same as the power density per unit bandwidth of the data signal in the first signal.

6. A communication system, comprising:
   a transmitting device configured to send a transmission signal according to OFDM; and
   a receiving device configured to receive the transmission signal send from the transmitting device, wherein
   the transmitting device includes
   a transmission signal generating unit configured to generate the transmission signal by inverse-Fourier-transforming a reference signal and a data signal mapped to subcarriers, and
   a transmitting unit configured to wirelessly transmit the transmission signal;
   a total power level allocated to a first signal to be transmitted at a timing when the reference signal and the data signal are frequency-multiplexed is equal to a total power level allocated to a second signal to be transmitted at a timing when only the data signal is mapped;
   at the timing of the first signal where the reference signal and the data signal are frequency-multiplexed, mapping of the data signal to a predetermined subcarrier is prevented and a power density per unit bandwidth of the reference signal is greater than a power density per unit bandwidth of the data signal; and
   the power density per unit bandwidth of the data signal in the second signal is the same as the power density per unit bandwidth of the data signal in the first signal.

7. A receiving device for receiving a transmission signal modulated according to OFDM and transmitted from a transmitting device, the receiving device comprising:
   a receiving unit configured to receive the transmission signal generated by inverse-Fourier-transforming a reference signal and a data signal mapped to subcarriers; and
   a processing unit configured to process the received transmission signal, wherein
   a total power level allocated to a first signal, which is transmitted at a timing when the reference signal and the data signal are frequency-multiplexed and received by the receiving unit, is equal to a total power level allocated to a second signal that is transmitted at a timing when only the data signal is mapped and received by the receiving unit;
   at the timing of the first signal where the reference signal and the data signal are frequency-multiplexed, mapping of the data signal to a predetermined subcarrier is prevented and a power density per unit bandwidth of the reference signal is greater than a power density per unit bandwidth of the data signal; and
   the power density per unit bandwidth of the data signal in the second signal is the same as the power density per unit bandwidth of the data signal in the first signal.

8. The receiving device as claimed in claim 7, wherein the receiving unit is configured to receive, from the transmitting device, power information indicating a difference between the power density per unit bandwidth of the reference signal and the power density per unit bandwidth of the data signal.

9. The receiving device as claimed in claim 8, wherein the data signal includes a user data signal and/or a control data signal.

10. The receiving device as claimed in claim 7, wherein the data signal includes a user data signal and/or a control data signal.

11. A method of receiving a transmission signal modulated according to OFDM, comprising the steps of:
   receiving, by a receiving unit of a receiving device, the transmission signal generated by inverse-Fourier-transforming a reference signal and a data signal mapped to subcarriers; and
   processing the received transmission signal, wherein
   a total power level allocated to a first signal, which is transmitted at a timing when the reference signal and the data signal are frequency-multiplexed and received by the receiving unit, is equal to a total power level allocated to a second signal that is transmitted at a timing when only the data signal is mapped and received by the receiving unit;

at the timing of the first signal where the reference signal and the data signal are frequency-multiplexed, mapping of the data signal to a predetermined subcarrier is prevented and a power density per unit bandwidth of the reference signal is greater than a power density per unit bandwidth of the data signal; and the power density per unit bandwidth of the data signal in the second signal is the same as the power density per unit bandwidth of the data signal in the first signal.

* * * * *